United States Patent Office 3,268,263
Patented August 23, 1966

3,268,263
INHIBITING SETTLING OF SOLID PARTICLES THROUGH A LIQUID
Hendrik Van Olphen, Bellaire, Tex., assignor to Shell Oil Company, New York, N.Y., a corporation of Delaware
No Drawing. Filed Nov. 18, 1963, Ser. No. 324,258
14 Claims. (Cl. 302—14)

The invention relates to inhibiting the vertical migration of solid particles through a liquid having a different density in which they are distributed and is useful for dynamic applications, such as the transportation of solid materials through a pipe line while dispersed in a liquid as well as for static applications, such as the stabilizing of dispersions of solid materials in a liquid, i.e., liquid fuel containing metal particles, during storage. The migration of such solid particles usually involves downward settling of the solids by gravity but may, when they are less dense than the liquid, involve upward settling or flotation.

Considering first dynamic applications, the transportation of granular materials, such as prells or pellets of solid chemicals, coal and iron ore, in a carrier liquid through a pipe line is known. Such transportation presents the problem of maintaining the granules in suspension within the carrier liquid due to the different, usually greater, density of the granules. The settling problem, considerations affecting settling rates, and certain remedies, including the introduction of a pseudo-liquid or other materials for limiting settling, are considered in the U.S. Patents No. 2,929,923 to Wasp et al. and No. 2,610,900 to Cross. As is evident from these disclosures, the granules are kept in suspension within the carrier liquid through turbulence, and for each system there is a "minimum non-settling velocity," which must be maintained if settling is to be avoided.

It is, however, often costly to flow the dispersion through a pipe line at flow rates greater than the minimum settling velocity; further, it is occasionally desirable to interrupt flow and it would be useful to have a suspension which permits interruption without incurring the danger of having the solid particles settle from the liquid within the pipe line and obstructing it.

Although the settling tendency can be reduced by reducing the particle diameters, this is often detrimental to the product being transported because it prevents the desired recovery of the particles at their destination in suitable sizes for dust-free storage or utilization. The cost of initial grinding is usually a drawback and re-constituting the particles into a commercially attractive material at the destination is often impossible and prohibitively high in cost.

Increasing the viscosity of the carrier liquid increases the pumping costs and requires the addition of considerable quantities of chemicals, such as metallic soaps, which are expensive and often contaminate the carrier liquid, which is, in many instances, to put to use after separation therefrom of the solids.

The formation of an emulsion, e.g., the emulsification in a carrier oil of aqueous phases which contain the solids partly in suspension and partly in solution in water, requires complex operations of forming the aqueous phase, forming and stabilizing the emulsion, breaking the emulsion at the destination, and recovering the transported solids. To be effective, large amounts of water must usually be transported with the oil and solids.

Considering static applications, it is known to suspend solid particles in a liquid by forming a gel in the latter. The formation of gels, however, involve special techniques and the addition to the liquid of gelling agents. These agents are often contaminants insofar as the ultimate utilization of the liquid or of the liquid-solid system is concerned. For example, they are not completely combustible with the liquid when the latter is a fuel. Also, the formation of a gel is often time-consuming and not always possible. Further, the resulting gel is often not mobile or not sufficiently so to permit its discharge through a pipe from a vessel after storage therein, or the gel becomes rigid or hardens after storage for an extended time or due to temperature changes.

It would be desirable to provide a simple way of stabilizing solid particles in distributed condition within a body of liquid which does not involve the use of gels and wherein the liquid retains its mobility. This would be useful, for example, in the production of fuels, such as liquid hydrogen having metal particles, e.g., aluminum or beryllium or lithium powder, suspended therein, e.g., for use as a rocket fuel.

The instant invention solves the above-mentioned problems by suspending the solid particles within the part of the liquid which contains a coherent interlaced matrix of small, thin pieces of a pliable material, said material being substantially insoluble in the liquid and said matrix having over 90%, usually over 98%, by volume of spaces which are filled by the said liquid.

By the use of small pieces of or shreds of the matrix material the said liquid-filled spaces are small, and the matrix is readily flowable although the individual pieces are in contact with each other throughout all or a part of the liquid. These pieces are thin, i.e., their smallest dimensions are less than 0.1 mm., e.g., to 0.05 mm., and their lengths, i.e., their longest dimensions are substantially greater than 10 microns and are usually between 0.1 and 3 mm., although the invention can also be applied, especially with fibrous material, to pieces which are considerably longer, such as up to 10 cm. The widths of these pieces are, in the case of fibers, the same as their thickness, but in the case of sheet-shaped pieces, also called plates, flakes or lamellae, they may have any dimension between the thickness and length, while larger pieces may be used. Specific examples are given hereinafter.

The matrix material may be any material of the size specified herein that is essentially insoluble in the carrier liquid, and may have the same density as the liquid or a lower or a higher density. When the density of the material differs greatly from that of the carrier liquid, as in the case of asbestos, it is desirable to include at least some longer pieces, several centimeters in length. Porosity and wettability of the material by the carrier liquid are not known to be significant. Most materials, especially fibers, are pliable; however, others, such as thin plates of styrofoam, are not but may be brittle. Examples are asbestos fibers, which may be shredded to reduce most of the mass to lengths principally between 0.5 and 1.5 mm., but including say 2 to 10%, by weight of fibers longer than 1 cm., cellulose, e.g., cotton, hemp, or paper similarly shredded or, in the case of paper, mulched in a comminuting device, to maximum dimensions less than 3 mm., and resins, e.g., thin flakes with maximum dimensions under 3 mm. shaved from a cellular resin, such as foamed polystyrene.

The coherence of the matrix is achieved by interlacing of the particles, as contrasted to interparticle forces, as in clay matrices, wherein coherence depends upon the composition of the liquid medium and the particles have smaller sizes, normally below 2 microns. In the interlaced system of the invention the coherence does not depend upon the composition of the medium provided, of course, that is not a solvent for the matrix material.

Typically 2 to 4% by weight of the solid matrix material—based on the carrier liquid—is used, but in special cases operations may be outside this range. The amount must be sufficient to form a coherent matrix.

The solid particles to be suspended may be of any composition which is preferably substantially insoluble in the carrier liquid, such as metal or non-metallic particles, e.g., aluminum, copper, iron and carbon coal, metal ore, wood chips and chemicals, such as potash, potash salts, e.g., unpurified potassium chloride, sodium chloride, soda ash, sodium sulphate, and phosphate rock. The particle sizes are not critical to the invention and will usually include particles having diameters between about 1 and 4000 microns or more. When the invention is used to avoid comminution of the particles, most of all of the solid particles will have diameters larger than 500 microns. The amount of the solids will vary with their particle size and density relative to the carrier liquid and also, in part, with the nature of the matrix material. Typically, from 5 to 40% by weight are dispersed, although the invention may be practiced outside of this range, e.g., using up to 50% of solids. By increasing the distribution of the sizes of the pieces from which the matrix is formed, the matrix is made stronger and more solid particles and/or larger particles can be carried without compression of the matrix; however, mobility and pumpability of the dispersion may be reduced by larger particles.

The invention may be practiced with any carrier liquid, such as water, brine, crude or refined petroleum, hydrazine, and normally gaseous liquids, e.g., liquid hydrogen, liquid nitrogen, or liquid ammonia.

The invention may be practiced by mixing the matrix material, solid particles and carrier in one operation. However, it is preferably practiced by first forming the matrix and thereafter introducing the solid particles, e.g., by feeding the particles into a stream of the matrix-containing liquid, while the liquid is flowed as a sheet, to expose a large surface.

The resultant dispersion is one in which the solid particles are embedded in or suspended in the matrix and thereby prevented from significant vertical migration through the liquid due to density differences. The said resultant dispersion has mobility and can be flowed through ducts or pipe lines and pumped. The matrix offers very little resistance to flow, especially when the amount of the matrix material is the least which will form a coherent matrix strong enough to suspend the solid particles. In fact it sometimes, as when wood chips are suspended, decreases flow resistance. Nevertheless, the ducts and pumps should be of a type which does not lead to clogging, especially when fibers of appreciable length are used for the matrix. Thus, it is often preferred to use a pump suitable for handling relatively thick slurries; a variety of such pumps are commercially available, e.g., those known in the paper industries. A specific non-clogging pump is described in the U.S. Patent No. 2,994,562 to Zalis. However, centrifugal pumps, preferred in pipe line operations, may be used when modified to avoid clogging.

The matrix is usually stable against settling by simple gravity and stirring and not destroyed by flow through ducts or pumps and does not significantly accumulate at the outside of bends in the pipe lines. However, the degree of stability depends on the concentration and type of matrix material, and complete stability against settling is not an absolute requirement, due to turbulence in the pipe. When the matrix is subjected to a strong gravitational field, as in a centrifuge, it can be compacted, carrying the embedded solid particles with it.

The transported material can be recovered from the dispersion, e.g., at the delivery end of the transport pipe line, by any of a variety of techniques. For example, the dispersion can be diluted with a fluid, such as the same liquid as that used as the carrier liquid, while stirring until the concentration of the matrix material is reduced to slightly less than the minimum concentration required to create a coherent supporting matrix for the particles, usually about 1% or less. Then the solids are no longer suspended and settle rapidly. The supernatant liquid containing the matrix material can be siphoned off. The settled particles can be further separated from the adhering liquid by washing on a screen with a miscible volatile liquid, and the solid particles can finally be dried. The matrix material can be recovered from the supernatant liquid by filtering on a screen, or the supernatant liquid can be used again by adding matrix material until the concentration is high enough to form a coherent matrix.

The invention will be further illustrated by the following examples.

*Example I*

Ashless cellulose filter paper was chopped with a Waring Blendor with water. The slurry was filtered, dried and then mulched in a synthetic crude oil with the Blendor, together with potash, to form a matrix containing potash in suspension. The average length of the paper fibers was 1.0 mm. covering a range from 0.1 to 3.0 mm., and the average thickness of the fibers was 0.03 mm. The synthetic crude had a specific gravity of 0.835 and a viscosity of 6.5 centistokes. In four different runs different quantities of the paper and potash were used. The potash consisted of particles having the following characteristics:

U.S. sieve No.:
   Retained on—                  Particles, percent w.
      16 _____ 1.2
      30 _____ 23.4
      50 _____ 42.2
      100 _____ 25.3
      200 _____ 5.8
   Passed 200 _____ 2.1

The mixtures were allowed to stand at 75° F. in a 2-liter mixing cylinder for 16 hours and the stabilities were determined by observation and measuring the volume occupied by the matrix and potash. The results are given in Table I, wherein a dash in the Sediment Level column indicates complete sedimentation.

TABLE I

| Run No. | Percent w. of oil | | Sediment Level, 16 hrs., percent v. | Remarks |
|---|---|---|---|---|
| | Cellulose | Potash | | |
| 1 | 0.5 | 2 | -- | Potash passed through matrix rapidly. |
| 2 | 1.0 | 2 | -- | Do. |
| 3 | 2.0 | 2 | 80 | Potash retained in matrix. |
| 4 | 2.0 | 10 | 45 | Potash compressed matrix. |

The dispersion of Runs 3 and 4 were also tested in a laboratory pipe line, comprising a centrifugal pump with a maximum capacity of 2 gal. per min., discharging into 10 ft. of ¼ in. pipe, followed by 8 ft. of ½ in. tubing, having 90° bends and thermometer wells. Dispersion 3 presented no pumping difficulties and the matrix was intact at the discharge end. Dispersion 4 caused clogging of the pump and lines within two minutes; plugs of potash formed at the 90° bends, the thermometer well and at the pump suction.

*Example II*

As a model for a rocket fuel of liquid hydrogen and metal powder, an aluminum powder was suspended in pentane at room temperature by means of a cellulose matrix, as described in Example I, being washed with methanol and then stirred into the pentane, together with the powder. The aluminum particles had diameters from about 2 to 35 microns. It was found that 3 grams of cellulose fiber per 100 milliliters of pentane supported 20 grams of aluminum powder with only a small subsidence of the matrix, which occupied over 90% of its original volume after 20 hours. No further subsidence was observed during the next several months. The settling experiments were carried out in 100 ml. stoppered graduate cylinders.

I claim as my invention:

1. Method of transporting solid particles dispersed in a liquid having a density different from that of the particles while inhibiting vertical migration of said particles through the liquid, which comprises the steps of:
    (a) forming in said liquid a coherent, interlaced, pumpable matrix of a multitude of pieces of thin, solid material which is substantially insoluble in said liquid having thickness under 0.01 mm. and lengths under 10 cm., by introducing into said liquid a sufficient quantity of said pieces to form a coherent mass which has over 90% by volume of spaces, said spaces being filled with said liquid, and distributing said solid particles within said matrix, and
    (b) flowing the resulting dispersion of solid particles, matrix and liquid through a pipe line.

2. Method of transporting solid particles dispersed in a liquid having a density different from that of the particles while inhibiting vertical migration of said particles through the liquid, which comprises the steps of
    (a) forming in said liquid a coherent, interlaced pumpable matrix of a multitude of pieces of thin, solid material which is substantially insoluble in said liquid, the matrix having over 90% by volume of spaces, said spaces being filled with said liquid, and distributing said solid particles within said matrix, and
    (b) flowing the resulting dispersion of solid particles, matrix and liquid through a pipeline.

3. Method as defined in claim 2 wherein said matrix consists essentially of a pliable fibrous material.

4. Method as defined in claim 2 wherein said matrix consists essentially of sheets.

5. Method as defined in claim 2 wherein said matrix is formed of shreds of said material having a thickness under 0.01 mm., and lengths under 10 cm.

6. Method as defined in claim 2 wherein said matrix material is cellulose.

7. Method as defined in claim 2 wherein said matrix material is asbestos.

8. Method as defined in claim 2 wherein said matrix material is a crushed cellular resin.

9. A dispersion comprising a carrier liquid, a multitude of small solid particles dispersed therein, and a coherent, interlaced matrix within said liquid for stabilizing said particles against vertical migration through the liquid, said matrix being formed of thin pieces of pliable fibrous material which is substantially insoluble in said liquid, said pieces having a thickness under 0.1 mm. and a length under 10 cm., said matrix having over 90% by volume of spaces, said spaces being filled with said liquid.

10. A dispersion as defined in claim 9 wherein said liquid is a normally gaseous substance.

11. A dispersion as defined in claim 9 wherein said liquid is a fuel and said solid particles are metallic.

12. A dispersion as defined in claim 9 wherein said pieces of fibrous material are cellulose.

13. A dispersion as defined in claim 9 wherein said pieces of fibrous material are asbestos.

14. A dispersion as defined in claim 9 wherein said pieces of fibrous material are cellular resin.

References Cited by the Examiner

UNITED STATES PATENTS

| | | | |
|---|---|---|---|
| 2,128,913 | 9/1938 | Burk | 302—66 |
| 2,492,173 | 12/1949 | Mysels | 302—14 |
| 2,610,900 | 9/1952 | Cross | 302—66 |
| 2,610,901 | 9/1952 | Cross | 302—66 |
| 2,920,923 | 1/1960 | Wasp | 302—14 |

FOREIGN PATENTS 401,820  11/1933  Great Britain.

EVON C. BLUNK, *Primary Examiner.*

ANDRES H. NIELSEN, HUGO O. SCHULZ,
*Examiners.*